Sept. 9, 1958  F. N. SETTERDAHL  2,850,831
FISH HOOKERS
Filed Aug. 13, 1956
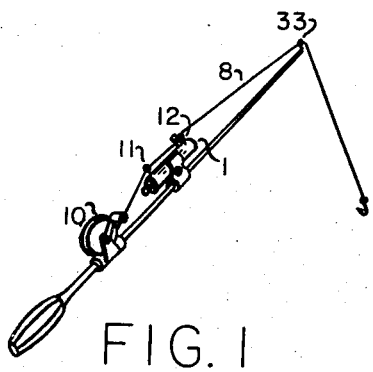
FIG. 1
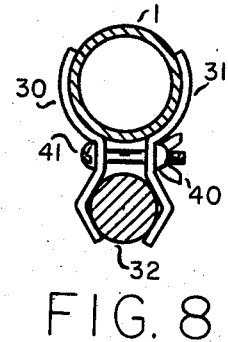
FIG. 8
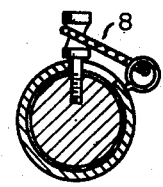
FIG. 4
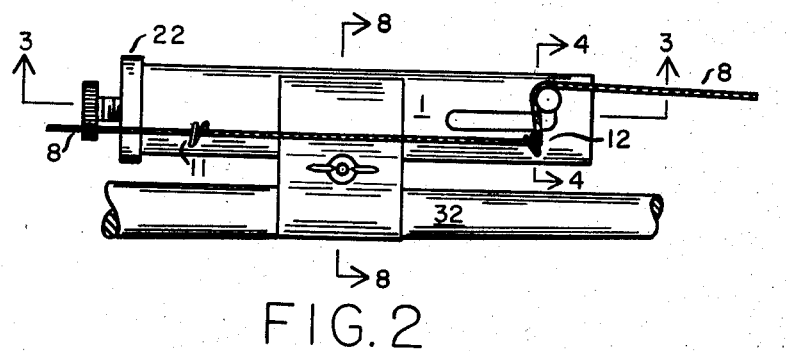
FIG. 2
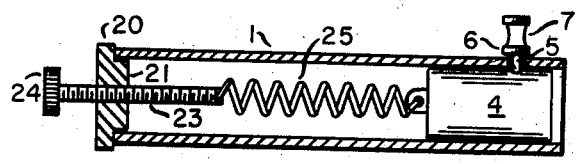
FIG. 3
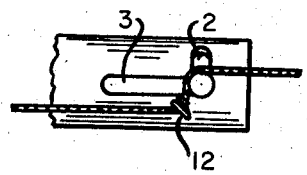
FIG. 5
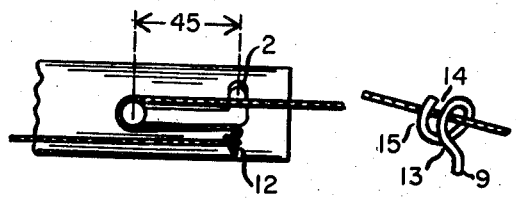
FIG. 6  FIG. 7
INVENTOR.
FRED N. SETTERDAHL
BY
Attorney ent Office
2,850,831
Patented Sept. 9, 1958

2,850,831

FISH HOOKERS

Fred N. Setterdahl, Rock Island, Ill.

Application August 13, 1956, Serial No. 603,557

4 Claims. (Cl. 43—15)

Devices which, responding to the slight movement of a fishing line caused by a fish nibbling on the bait on the hook, cause the line suddenly to be drawn in a few inches, are known. This sudden jerk on the fish line serves to fix the fish hook firmly in the mouth of the fish, preventing loss of the fish when the angler draws in the line.

In general, such devices include a spring, a movable trigger mechanism that holds the spring stretched, and means responsive to a slight jerk on the fish line which releases the trigger mechanism.

The invention resides in a novel, simple construction that permits the tightening of the fish line to directly release the spring actuated mechanism which jerks the line, without the interposition of movable trigger mechanism.

The object of the invention is to provide means to jerk a fish line that are set in operation by the slight movement of the line as the fish nibbles.

Another object is to accomplish this by a construction wherein the slight pull on the line will cause a spring actuated plunger to be rotated enough to move a holding pin off the cocking ledge.

Another object is to construct a simple device of the type described free of complicated trigger mechanism.

Instead of having to stretch a spring and place a trigger release mechanism to hold the spring cocked, the user simply moves a stud along the two legs of an L-shaped slot. Moving the stud along the longitudinal leg of the slot stretches the spring and moving the stud into the slot at right angles holds the spring stretched. The fishing line is so placed that the slight pull when the fish nibbles moves the stud back into the longitudinal slot allowing the spring to contract and draw in the line.

The invention will be illustrated by a form in which the L-shaped slot is cut into a hollow tube.

Figure 1 shows in perspective a fish pole to which the invention is attached.

Figure 2 shows the invention in elevation to a larger scale in triggered position.

Figure 3 shows a section of the invention along lines 3—3 in Figure 2.

Figure 4 shows a section along lines 4—4 in Figures 2 and 3.

Figure 5 shows the right hand portion of the parts shown in Figure 2 just after the fish line has been tightened moving the stud to spring releasing position.

Figure 6 similar to Figure 5 shows the parts after the spring has jerked the fish line trapping the fish.

Figure 7 shows in perspective one of eyes through which the fishing line is passed.

Figure 8, a section along lines 8—8 of Figure 2, shows the clamp that holds the invention to any desired fish rod.

In these figures 1 represents a support, which may be a tube, having an L-shaped opening consisting of two intersecting slots. The slot 3 extends longitudinally and the slot 2 is normal to slot 3. Inside the tube a plug 4 slides freely in the tube. To reduce weight, plug 4 may be a short section of tube of smaller diameter than tube 1. This plug 4 carries a stud 5 that may have an enlarged head 6. This head may carry a groove 7 for a fish line 8. This line 8 extending from a reel 10 passes through eyes 11 and 12 carried by the tube 1 and then around stud 5 in groove 7.

As shown in Figure 7, each eye 11 or 12 may consist of a wire 9 fastened to tube 1 by soldering, welding, or other means and bent into more than one complete loop 13 and a partial loop 15 with a space 14 between loops 13 and 15 sufficient to allow line 8 to be readily placed in the position shown in Figure 7 after casting, thus eliminating the need of threading the line through the eye by inserting its free end.

A disc 20 has a shoulder 21 projecting into the tube and an outer flange 22. A threaded bolt 23 having a head 24 passes through an axial threaded hole in disc 20 to a spring 25, under tension, connected to the inner end of bolt 23 and plug 4. This spring has a plurality of functions. It serves to draw the plug 4 as far to the left as the position of stud 5 in the slot 3 allows. It also serves to draw the flanges of disc 20 against the end of tube 1.

The clamp shown in Figure 8 may consist of two pieces 30, 31 having surfaces that will fit frictionally against the outer surface of tube 1 and the outer surface of a fish rod 32 carrying a reel 10. One of the two pieces 30, 31 may be permanently attached to tube 1. The lower ends of pieces 30 and 31 may be bent to form a V that will enable the clamp to engage fish rods 32 of various diameters. Wing nut 40 on stud 41 permits drawing up the clamp. The fish rod, at its end, carries the eye 33.

In the use of the invention, the line 8 during casting passes directly from reel 10 which has a conventional locking means through eye 33. After casting, the line 8 is inserted into the two eyes 11 and 12 through the space 14 shown in Figure 7 so that the line passes longtudinally through both eyes. Placing his hand on the open end of tube 1, the fisherman places his finger under stud 5 resting in the slot 3 and lifts it up, against the pull of spring 25, successively moving it from the position Figure 6 through the positions in which it is shown in Figure 5 to the position shown in Figure 2 where the stud rests in slot 3. The line extending from the eye 12 to the eye 33 is then passed around stud 5 resting in groove 7. The reel is now placed in locked position.

With the reel in locked position the portion of the line passing through eyes 11 and 12 is fixed against longitudinal movement. Accordingly, any pull on the reel end of line 8 will tend to draw stud 5 from the position shown in Figure 4 toward eye 12. Since in so doing the spring tension is not changed, it requires little force on line 8 to move the stud 5 from the position shown in Figure 2 to Figure 5 where the stud is in slot 2.

It will be noted by reference to Figure 4 that the sensitivity of the apparatus depends on the leverage created by the pull on cord 8 to turn the plug 4 in the pipe 1. This leverage is increased as the distance of line 8 from the center of the tube increases. Hence, the provision of the groove 7, which moves one end of the portion of line 8 away from the center of the tube, and the height of eye 12 increases the sensitivity of the device.

The spring 25 now becomes effective, instantaneously moving stud 5 from the position shown in Figure 5 to that shown in Figure 6. The portion of the line between eye 12 and eye 33 has now been increased by twice the axial distance 45 from the initial position of stud 5 to its present position. Since the portion of the line extending through eyes 11 and 12 is practically locked against movement at this stage of operations as described, the line 8 must be drawn in through eye 33 by twice the distance 45. As this takes place suddenly, the hook in the fish's mouth is jerked into the tissues to prevent the fish from escaping before the line can be drawn in. The force of the jerk can be varied by holding the head 24 between the fingers of one hand in fixed relation to tube 1 and turning the flange 22 with the fingers of the other hand. This moves the bolt 23 axially and increases or decreases the tension of spring 25.

It will be obvious to those skilled in the art that the invention is not limited to the particular form in which it is illustrated herein and that it can be adapted to the wide range of requirements met in various types of fishing.

I claim:

1. A device attachable to a fish pole which comprises a tube, a plug movable in said tube, a stud carried by said plug, a first slot extending axially of said tube through which said stud extends, a second slot extending circumferentially from said first slot on one side thereof into which said stud can move, coiled spring means connected to one end of the tube and to said plug, a guiding eye for a fish line mounted on said tube near said second slot on the side of the first slot opposite said second slot so that the fish line leading along the fish pole may be passed around said stud when located in the second slot in such manner that a slight tension in the fish line will draw the stud from the second slot into the first slot to permit the spring to draw the stud down the length of the first slot thereby suddenly drawing in the fish line.

2. In a device of the type described in claim 1, spring-tension varying means comprising a bolt attached to said spring and a disc adapted to bear against said tube threaded on said bolt.

3. In a device of the type described in claim 1, the guiding eye mounted on said tube holding the fish line a distance from the central axis of the tube, a circumferential groove around said stud at substantially the same distance from the central axis of the tube to increase the leverage of the fish line on the stud during an initial pull on the fish line.

4. A triggered device carried by a rod which is adapted to jerk a line when a free end of the line is pulled, comprising, in combination, a rod, a tube attached parallel to said rod, a longitudinal slot in said tube, a guide for the line attached to said tube near the forward end of said slot on one side thereof, a notch in said slot extending radially away from the line guide on the opposite side of the slot, a plug movable in said tube, a stud extending out from said plug through said slot, a spring in said tube biasing said stud toward the rear end of the slot, means to hold the line in fixed relation to the rear end of said tube, a second guide carried by said rod for the free end of the line located beyond the forward end of said tube, the line being adapted to release the stud when in triggered position in said notch said line extending from the holding means through said first guide, radially around said stud in said notch and then forward through said second guide whereby a slight tension in the line will draw the stud from the notch into the slot to permit the spring to draw the stud down the length of the slot thus suddenly drawing in the line.

References Cited in the file of this patent

UNITED STATES PATENTS

| 608,063 | Mintzer | July 26, 1898 |
| 2,316,256 | Kohn | Apr. 13, 1943 |
| 2,552,516 | Camp | May 15, 1951 |
| 2,590,721 | Muth | Mar. 25, 1952 |
| 2,746,197 | Rogers | May 22, 1956 |

FOREIGN PATENTS

| 87,575 | Germany | July 18, 1896 |